United States Patent
Kim et al.

(10) Patent No.: US 9,197,415 B2
(45) Date of Patent: *Nov. 24, 2015

(54) METHOD AND APPARATUS OF CIPHER COMMUNICATION FOR MANAGEMENT FRAME USING QUALITY OF SERVICE MECHANISM IN WIRELESS LOCAL AREA NETWORK SYSTEM

(71) Applicant: LG ELECTRONICS INC., Seoul (KR)

(72) Inventors: Eun Sun Kim, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,360

(22) Filed: Nov. 26, 2014

(65) Prior Publication Data

US 2015/0089237 A1  Mar. 26, 2015

Related U.S. Application Data

(63) Continuation of application No. 13/821,856, filed as application No. PCT/KR2011/006699 on Sep. 9, 2011, now Pat. No. 8,924,732.

(60) Provisional application No. 61/381,444, filed on Sep. 10, 2010.

(51) Int. Cl.
*H04L 29/06* (2006.01)
*H04L 9/32* (2006.01)
*H04W 12/02* (2009.01)
(Continued)

(52) U.S. Cl.
CPC ............... *H04L 9/3228* (2013.01); *H04L 9/32* (2013.01); *H04L 9/3244* (2013.01); *H04W 12/02* (2013.01); *H04W 12/06* (2013.01); *H04W 72/087* (2013.01); *H04W 84/12* (2013.01); *H04L 2209/42* (2013.01); *H04L 2209/80* (2013.01)

(58) Field of Classification Search
CPC ...... H04L 9/32; H04L 2209/80; H04L 9/3244; H04W 12/02; H04W 12/06
See application file for complete search history.

(56) References Cited

FOREIGN PATENT DOCUMENTS

KR  10-2006-0091018 A   8/2006

OTHER PUBLICATIONS

Fischer, "MFQ MMPDU MAC Sequence Numbering Normative Text Proposal," IEEE 802.11-10/0850r3, Jul. 2010, 7 pages.
(Continued)

*Primary Examiner* — Carl Colin
*Assistant Examiner* — Ghodrat Jamshidi
(74) *Attorney, Agent, or Firm* — Birch, Stewart, Kolasch & Birch, LLP

(57) ABSTRACT

A method and apparatus are described for performing cipher communication in a wireless local area network system. A pseudo noise (PN) code sequence for a plaintext Medium Access Control (MAC) protocol data unit (MPDU) is obtained. An additional authentication data (AAD) is constructed by using at least one field in a header of the plaintext MPDU. A Nonce is constructed from the PN code sequence, an Address 2 field in the header of the plaintext MPDU and a Priority field in the header of the plaintext MPDU. A counter mode (CTR) is generated with cipher block chaining (CBC)-MAC Protocol (CCMP) header. Encrypted data and Message Integrity Code (MIC) are generated by using a temporal key, the AAD, and the Nonce. An encrypted MPDU is generated to be transmitted to a peer station by combining the plaintext MPDU header, the CCMP header, the encrypted data and the MIC.

20 Claims, 8 Drawing Sheets

| | B0 | B1 | B2 | B3 B4 | B5 | B6 | B7 |
|---|---|---|---|---|---|---|---|
| | Pre-Auth | No Pairwise | PTKSA Replay Counter | GTKSA Replay Counter | Management Frame Protection Required (MFPR) | Management Frame Protection Capable (MFPC) | |
| Bits: | 1 | 1 | 2 | 3 | 1 | 1 | |

| | B8 | B9 | B10 | B11 | B12 | B13 | B14 | B15 |
|---|---|---|---|---|---|---|---|---|
| | Protected MFQ Capable | Peerkey Enabled | SPP A-MSDU Capable | SPP S-MSDU Required | PBAC | Extended Key ID for Unicast | Reserved | |
| Bits: | 1 | 1 | 1 | 1 | 1 | 1 | 2 | |

(51) Int. Cl.
    *H04W 12/06* (2009.01)
    *H04W 84/12* (2009.01)
    *H04W 72/08* (2009.01)

(56) References Cited

OTHER PUBLICATIONS

"Draft Amendment to Standard for Telecommunications and Information Exchange Between Systems—LAN/MAN Specific Requirements—Part 11: Wireless Medium Access Control (MAC) and physical layer . . . ," IEEE Std 802.11I/D5.0, Aug. 2003, New York, NY, XP17646661A, 186 pages.

"IEEE Standard for Information technology—Telecommunications and information exchange between systems—Local and metropolitan area networks—Specific requirements Part 11. Wireless LAN Medium Access Control . . . ," IEEE P802.11e/D13.0, New York, NY, Jan. 2005, XP008132989, 198 pages.

Cam-Winget et al., "IEEE 802.11i Overview", NIST 802.11 Wireless LAN Security Workshop, Dec. 2002, http://csrc.nist.gov/archive/wireless/S10_802.11i%20overview-jwl.pdf (retrieved from the Internet Jan. 22, 2014), 105 pages.

Ergen, "IEEE 802.11 Tutorial," Department of Electrical Engineering and Computer Science University of California Berkeley, Jun. 2002, pp. 1-90.

Fischer, "MFQ MMPDU MAC sequence numbering Normative Text proposal", IEEE P802.11 Wireless LANs, Jul. 12, 2010, https://mentor.ieee.org/802.11/dcn/10/11-10-0850-03-00ae-mfg-mmpdu-mac-sequence-numbering-norm-text.doc (retrieved from the Internet Jan. 22, 2014), 6 pages.

Junaid et al., "Vulnerabilities of IEEE 802.11i Wireless LAN CCMP Protocol," Proceedings of World Academy of Science, Engineering and Technology, vol. 11, Feb. 2006, pp. 228-233.

Lambert, "TGi Comment Resolution for CCMP", IEEE P802.11 Wireless LANs, Jan. 14, 2004, https://mentor.ieee.org/802.11/file/04/11-04-0129-00-000i-tgi-comment-resolution-ccmp.doc (retrieved from the Internet Jan. 22, 2014), 8 pages.

M. Fischer, "MFQ MMPDU MAC Sequence Numbering Normative Text Proposal," IEEE 802.11-10/0850r4, Jul. 2010, 6 pages.

Figure 10

| Element ID | Length | Version | Group Data(11w) Cipher Suite | Pairwise Cipher Suite Count | Pairwise Cipher Suite List |
|---|---|---|---|---|---|
| 1 | 1 | 2 | 4 | 2 | 4×m |

Octets:

| AKM Suite Count | AKM Suite List | RSN Capabilities | PMKID-Count | PMKID List | Group Management Cipher Suite |
|---|---|---|---|---|---|
| 2 | 4×n | 2 | 2 | 16×s | 4 |

Octets:

Figure 11

| B0 | B1 | B2 | B3 B4 | B5 | B6 | B7 |
|---|---|---|---|---|---|---|
| Pre-Auth | No Pairwise | PTKSA Replay Counter | GTKSA Replay Counter | Management Frame Protection Required (MFPR) | | Management Frame Protection Capable (MFPC) |

Bits: 1 | 1 | 2 | 3 | 1 | 1

| B8 | B9 | B10 | B11 | B12 | B13 B14 | B15 |
|---|---|---|---|---|---|---|
| Protected MFQ Capable | Peerkey Enabled | SPP A-MSDU Capable | SPP S-MSDU Required | PBAC | Extended Key ID for Unicast | Reserved |

Bits: 1 | 1 | 1 | 1 | 1 | 1 | 2

METHOD AND APPARATUS OF CIPHER COMMUNICATION FOR MANAGEMENT FRAME USING QUALITY OF SERVICE MECHANISM IN WIRELESS LOCAL AREA NETWORK SYSTEM

CROSS-REFERENCE TO RELATED APPLICATIONS

This application is a continuation of co-pending U.S. patent application Ser. No. 13/821,856 filed on Mar. 8, 2013, which is the National Phase of PCT/KR2011/006699 filed on Sep. 9, 2011, which claims the benefit of U.S. Provisional Application No. 61/381,444 filed on Sep. 10, 2010, the entire contents of all of the above applications are hereby incorporated by reference.

BACKGROUND OF THE INVENTION

1. Field of the Invention

The present invention relates to wireless communications, and more particularly, to a cipher communication method for a management frame transmitted using a quality of service (QoS) mechanism in a wireless local area network (WLAN) and an apparatus for supporting the method.

2. Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted.

In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

A security mechanism in a WLAN system is provided for a data frame and a management frame. The security mechanism is applicable to a station's authentication procedure, association procedure, and frame transmission procedure.

With the increase in the use of the WLAN system, WLAN implementation is actively underway. As a result, leakage of personal information through the WLAN gradually becomes a problem. Therefore, it is important to provide a method of enforcing security in the WLAN system.

SUMMARY OF THE INVENTION

The present invention provides a cipher communication method for a management frame transmitted using a quality of service (QoS) mechanism in a wireless local area network (WLAN) and an apparatus for supporting the method.

In an aspect, a method of cipher communication for management frame performed by station in wireless local area network system includes obtaining a first pseudonoise code sequence (PN) for a plaintext Medium Access Control (MAC) protocol data unit (MPDU), constructing an additional authentication data (AAD) by using fields in a header of the plaintext MPDU, constructing a Nonce value from the PN, an Address 2 and a Priority field in the header of the plaintext MPDU, generating a encrypted MPDU from the plaintext MPDU by using a temporal key, the AAD, and the Nonce value, and transmitting the encrypted MPDU to a peer station, wherein the plaintext MPDU is a management flame including a sequence number field, the sequence number field including access category field indicating category of data included in the plaintext MPDU, and the Nonce value includes a priority field matched with the access category field.

The sequence number field may have a length of 12 bits and the access category field has a length of 2 bits that is a last 2 bits of the sequence number field.

The sequence number field may be masked to a value 0 except the access category field.

The AAD may further include a QoS control field indicating priority of the plaintext MPDU.

Bits 0 to 3 of the Priority field may be set to value of bits 0 to 3 of the QoS control field.

Bits 0 to 1 of the Priority subfield may bee set to the value of the Access Category field and bits 2 to 3 of the Priority subfield may be set to the fixed value of 0.

In another aspect of the present invention, an apparatus for performing cipher communication of management frame in wireless local area network system includes a processor. The processor is configured to obtain a first pseudonoise code sequence (PN) for a plaintext Medium Access Control (MAC) protocol data unit (MPDU), construct an additional authentication data (AAD) by using fields in a header of the plaintext MPDU, construct a Nonce value from the PN, an Address 2 and a Priority field in the header of the plaintext MPDU, generate a encrypted MPDU from the plaintext MPDU by using a temporal key, the AAD, and the Nonce value, and transmit the encrypted MPDU to a peer station, wherein the plaintext MPDU is a management frame including a sequence number field, the sequence number field including access category field indicating category of data included in the plaintext MPDU, and the Nonce value includes a priority field matched with the access category field.

The present invention provides a cipher communication method for a management frame transmitted using a quality of service (QoS) mechanism in a wireless local area network (WLAN) and an apparatus for supporting the method. The method can improve security of the wireless LAN system.

BRIEF DESCRIPTION OF THE DRAWINGS

FIG. 10 shows an example of an RSN information element format that can be included in a Beacon frame, an Association Request frame, an Association Response frame.

FIG. 11 shows an example of a format of an RSN Capabilities field among RSN Information elements.

DETAILED DESCRIPTION OF EMBODIMENTS

Hereinafter, a management procedure in a wireless communication system and a station supporting the management procedure according to exemplary embodiments of the invention will be described in detail with reference to the accompanying drawings. In the following embodiments, a wireless LAN (WLAN) system is described as a wireless communication system, but this is only exemplary. Accordingly, the embodiments to be described below can be applied to wireless communication systems other than the WLAN system, as long as they can be permitted in nature. In this case, terms or words specific to the WLAN system used in the embodiments can be properly modified into terms or words customarily used in the corresponding wireless communication system.

Figure 1:
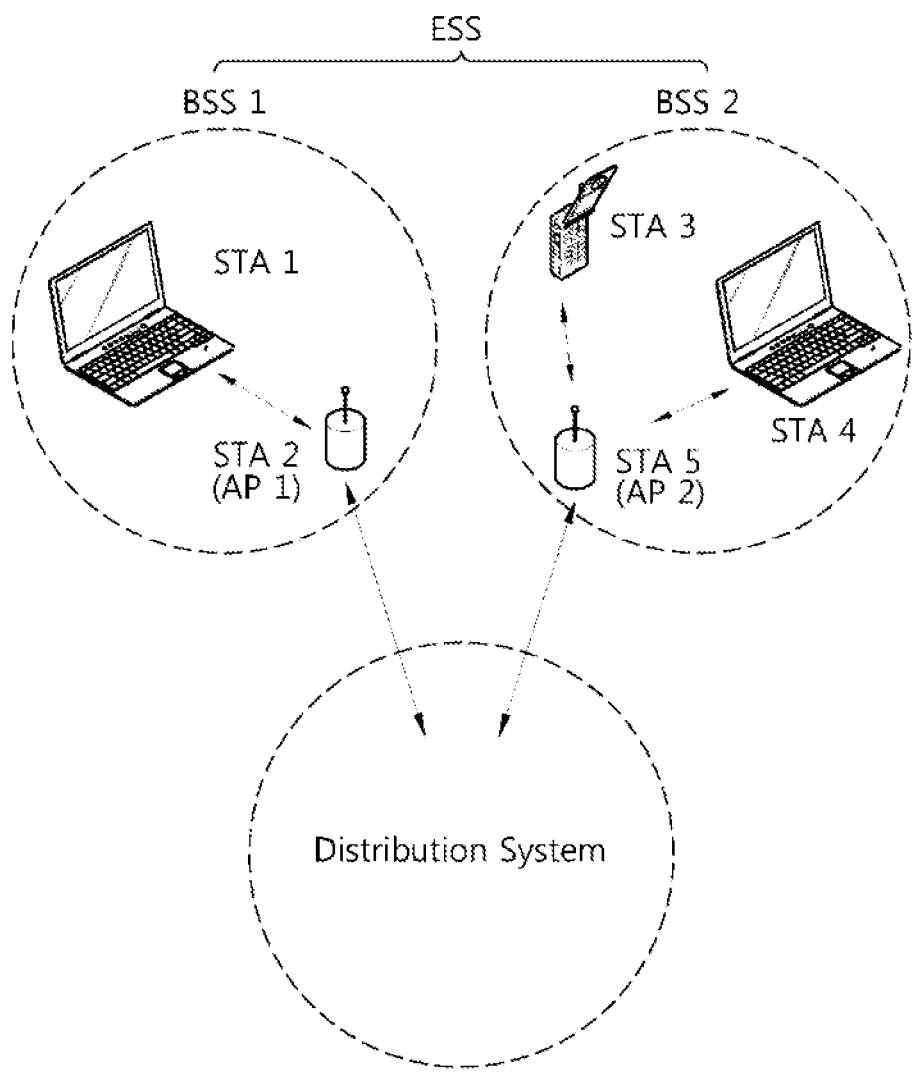
FIGS. 1 and 2 schematically show configurations of examples of a WLAN system to which the embodiments of the invention can be applied.
Figure 2:
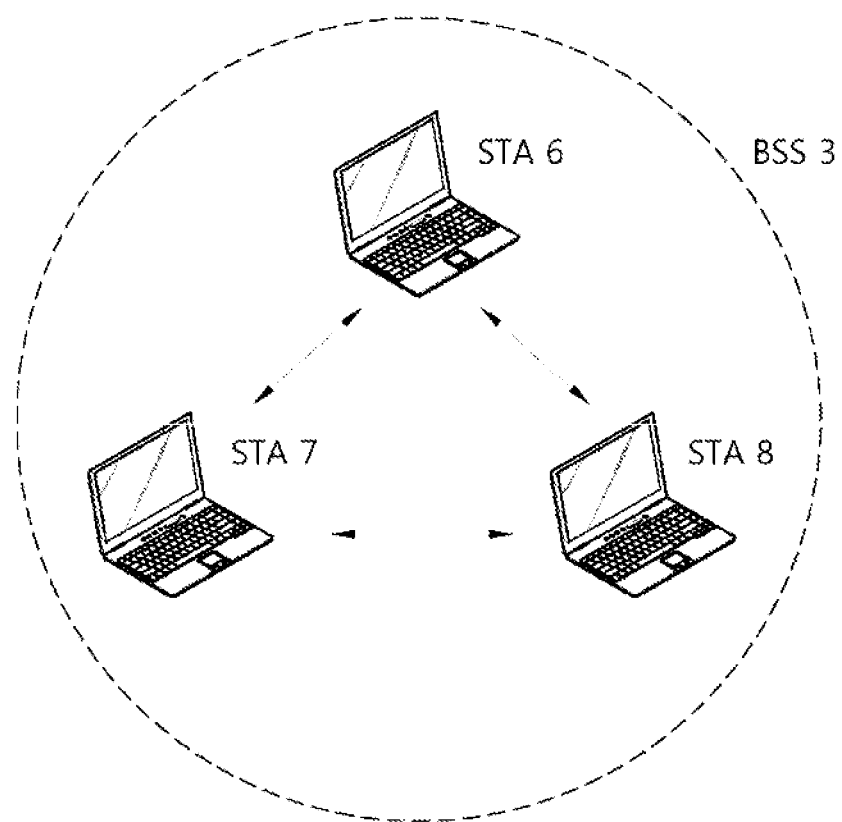

FIGS. 1 and 2 schematically show configurations of examples of a WLAN system to which the embodiments of the invention can be applied.

As shown in FIGS. 1 and 2, a WLAN system includes one or more basic service sets (BSS). The BSS is a set of stations (STAs) which can be successfully synchronized and communicate with each other, but is not a concept indicating a specific area. The BSS can be classified into an infrastructure BSS and an independent BSS (IBSS). The former is shown in FIG. 1 and the latter shown in FIG. 2. The infrastructure BSSs BSS1 and BSS2 include one or more STAs STA1, STA2, STA3, and STA4, an access point (AP) which is a STA providing a distribution service, and a distribution system (DS) connecting plural APs AP1 and AP2. On the contrary, the IBSS does not include an AP and all the STAs are mobile stations STA6, STA7, and STA8. In the IBSS, an access to the DS is not permitted, thereby constituting a self-contained network.

A STA is a functional unit including a medium access control (MAC) interface and a physical layer interface for a wireless medium in accordance with the IEEE 802.11 standard and includes both APs and non-AP stations in a wide meaning. A station for wireless communication includes a processor and a transceiver and further includes a user interface and a display unit. The processor is a functional unit designed to generate a frame to be transmitted through a wireless network or to process a frame received through the wireless network and serves to perform a variety of functions of controlling the station. The transceiver is operably connected to the processor and is a unit designed to transmit and receive frames through a wireless network.

A portable terminal operated by a user is a non-AP STA (STA1, STA3, STA4, STA6, STA7, and STA8). Simply, a STA may mean a non-AP STA. The non-AP STA may be called a wireless transmitting/receiving unit (WTRU), a user equipment (UE), a mobile station (MS), a portable terminal, or a mobile subscriber unit.

The AP (AP1 and AP2) is a functional entity providing connection to the DS through a wireless medium for the associated stations. A communication between the non-AP STAs in the infrastructure BSS including an AP is made through the AP in principle, but the non-AP STAs may communicate directly with each other when a direct link is set up therebetween. The AP may be called a convergence controller, a base station (BS), a node-B, a base transceiver system (BTS), or a site controller, in addition to the tile of an access point.

Plural infrastructure BSSs can be connected to each other through the DS. The plural BSSs connected through the DS are called an extended service set (ESS). The STAs in the ESS can communicate with each other and the non-AP STAs can move from one BSS to another BSS while communicating without any interception.

The DS is a mechanism for allowing an AP to communicate with another AP. Accordingly, the AP can transmit a frame for the STAs associated with the BSS managed by the AP, forward a frame when a STA moves to another BSS, or forward a frame to an external network such as a wired network. The DS may not be a network necessarily, and is not limited in type as long as it can provide a predetermined distribution service defined in the IEEE 802.11 standard. For example, the DS may be a wireless network such as a mesh network or a physical structure for connecting the APs to each other.

Figure 3:
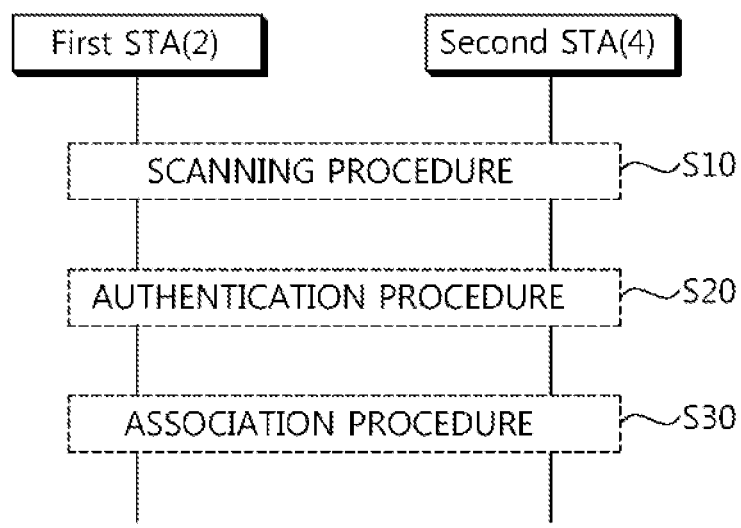
FIG. 3 is a flowchart showing an authentication and association procedure of a STA in a WAN system shown in FIG. 1 or FIG. 2 or a wireless communication system including the STA.

FIG. 3 is a flowchart showing an authentication and association procedure of a STA in a WLAN system shown in FIG. 1 or FIG. 2 or a wireless communication system including the STA. Although a procedure performed between a first STA 2 and a second STA 4 shown in FIG. 3 may be a procedure performed between an AP and a non-AP STA constituting an infrastructure BSS, it is apparent that the present embodiment is not limited thereto. For example, the present embodiment can equally or equivalently apply to an operation between non-AP STAs constituting the IBSS, an operation between mesh points (MPs) constituting a mesh network system, or an operation between UEs constituting another wireless communication system or between a UE and a BS, unless it is not applicable inherently.

Referring to FIG. 3, a radio measurement procedure in the wireless communication system according to the embodiment of the present invention includes a scanning procedure S10, an authentication procedure S20, and/or an association procedure S30 as preliminary procedures.

The scanning procedure S10 is first performed between the first STA 2 and the second STA 4. The scanning procedure S10 is a procedure of searching for a candidate STA which is a target to be associated in the association procedure S30. For example, the scanning procedure S10 can be considered as a procedure of searching for an AP by a non-AP STA in the infrastructure BSS. However, in a broader sense, the scanning procedure S10 may include a procedure of searching for a neighbor non-AP STA by a non-AP STA in case of the IBSS or a procedure of searching for a neighbor MP in case of a mesh network.

The scanning procedure has two types. The first type is passive scanning which uses a beacon frame transmitted from the second STA 4 or the like. According to the passive scanning, the first STA 2 which intends to access to the WLAN can find an accessible BSS by receiving the beacon frame transmitted periodically from an AP (i.e., the second STA 4 or the like) that manages a corresponding BSS (or IBSS). The passive scanning is applicable when the second STA 4 is the AP that transmits the beacon frame.

The second type is active scanning. According to the active scanning, the first STA 2 which intends to access to the WLAN first transmits a probe request frame. Upon receiving the probe request frame, the second STA 4 (i.e., the AP) transmits to the first STA 2 a probe response frame including information on a service set ID (SSID) of the BSS managed by the AP and capability supported by the AP. Therefore, the first STA 2 can know a variety of information regarding the candidate AP together with the existence of the candidate AP by using the received probe response frame.

If the second STA 4 which transmits the beacon frame or the probe response frame in the scanning procedure S10 is an apparatus that supports an MFQ service to be described below according to the embodiment of the present invention, information for reporting that the MFQ service is supported may be included in the beacon frame or the probe response frame. The beacon frame or the probe response frame may include a Protected MFQ Capable field or an MFQ policy information element which includes information for reporting whether the MFQ service is supported. Details thereof will be described below together with the explanation of a frame format.

Referring back to FIG. 3, the authentication procedure S20 is performed between the first STA 2 and the second STA 4. The authentication procedure S20 is a procedure for negotiating the authentication procedure, a cipher mechanism, or the like between entities that participate in radio communication. For example, the first STA 2 can perform the authentication procedure S20 with the second STA (i.e., the AP) to be associated among one or more APs which are found in the scanning procedure S10. When using an open system authentication scheme, the second STA 4 performs the authentication procedure unconditionally with respect to an authentication request from the first STA 2. Examples of a further enforced authentication scheme include IEEE 802.1x based EAP-TLS (Extensible Authentication Protocol-Transport Layer Security), EAP-TTLS (Extensible Authentication Protocol-Tunneled Transport Layer Security), EAP-FAST (Extensible Authentication Protocol-Flexible Authentication via Secure Tunneling), PEAP (Protected Extensible Authentication Protocol), etc.

After authentication is successfully complete in the authentication procedure S20, the first STA 2 performs the association procedure S30. The association procedure may be an arbitrary procedure performed when the first STA 2 is a non-AP STA and the second STA 4 is an AP. The association procedure S30 is a procedure for establishing a connection (i.e., a radio link) identifiable between the first STA 2 and the second STA 4. For the association procedure S30, the first STA 2 transmits an association request frame to the second STA 4 which successfully completes the authentication procedure S20, and in response thereto, the second STA 4 transmits to the first STA 2 an association response frame having a status value of 'successful'. The association response frame includes an identifier that can identify association with the first STA 2. The identifier may be an association ID (AID).

If a connection status between the first STA 2 and the AP (i.e., the second STA 4) deteriorates due to a variable channel condition even after the association procedure S30 is successfully complete, the first STA 2 can perform the association procedure again with another accessible AP, which is called a reassociation procedure. The reassociation procedure is very similar to the aforementioned association procedure S30. More specifically, in the reassociation procedure, the first STA 2 transmits a reassociation request frame to a different AP (i.e., an AP which successfully completes the authentication procedure S20 among candidate APs found in the aforementioned scanning procedure S10) which is not a currently associated AP, and the different AP transmits a reassociation response frame to the first STA 2. However, the reassociation request frame further includes information regarding a previously associated AP. By using this information, the reassociated AP can deliver data which is buffered in the old AP (i.e., the second STA 4) to the first STA 2.

According to one aspect of the present invention, the association response frame and the reassociation response frame in the association procedure S30 or the reassociation procedure can also include the Protected MFQ Capable field or the MFQ policy information element that includes information reporting whether the aforementioned MFQ service is supported.

After performing the authentication and association procedure between the first STA 2 and the second STA 4 through the procedure of FIG. 3, a radio frame can be transmitted/received between the first STA 2 and the second STA 4.

In the WLAN system, a radio frame can be classified into a control frame, a management frame, and a data frame.

A security mechanism is provided for the data frame and the management frame in the IEEE 802.11 WLAN system. The IEEE 802.11 WLAN system provides data confidentiality, authentication, integrity and replay protection by using Temporal Key Integrity Protocol (TKIP) and CTR- with CBC-MAC Protocol (CCMP).

Figure 4:
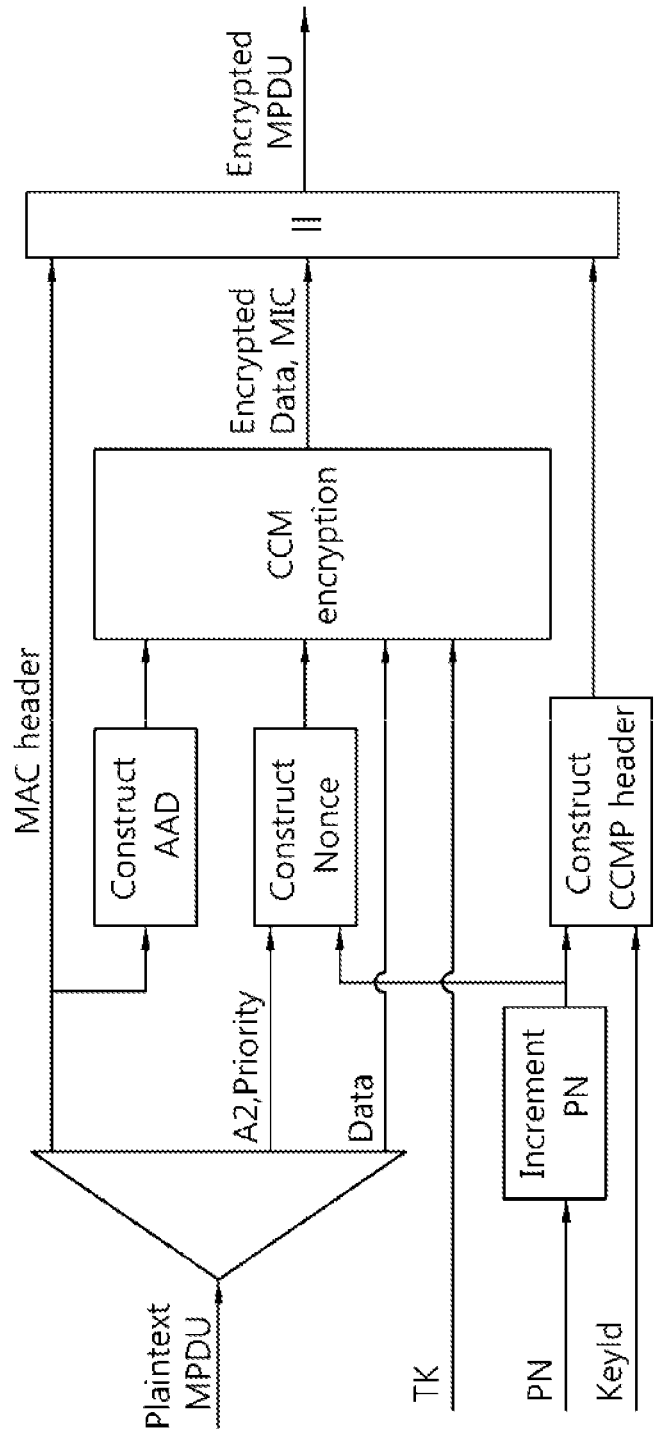
FIG. 4 is a CCMP encapsulation block diagram.

FIG. 4 is a CCMP encapsulation block diagram.

Additional authentication data (AAD) is configured by using a MAC header from a plaintext MPDU corresponding to a MAC protocol data unit (MPDU) of plaintext. The AAD is data that are not encrypted, but are cryptographically protected.

In addition, a Nonce value is configured by using Address 2, Priority, and PN values included in the MAC header from the MPDU corresponding to the plaintext. The nonce is a numerical value, used in cryptographic operations associated with a given cryptographic key, that is not to be reused with that key, including over all reinitializations of the system through all time.

An encrypted MPDU is generated from the plaintext MPDU by using Temporal Key (TK), AAD, and Nonce values.

CCMP encrypts the payload of a plaintext MPDU and encapsulates the resulting cipher text using the following steps:

a) Increment the PN, to obtain a fresh PN for each MPDU, so that the PN never repeats for the same temporal key. Note that retransmitted MPDUs are not modified on retransmission.

b) Use the fields in the MPDU header to construct the additional authentication data (AAD) for CCM. The CCM algorithm provides integrity protection for the fields included in the AAD. MPDU header fields that may change when retransmitted are muted by being masked to 0 when calculating the AAD.

c) Construct the CCM Nonce block from the PN, A2, and the Priority field of the MPDU where A2 is MPDU Address 2.

d) Place the new PN and the key identifier into the 8-octet CCMP header.

e) Use the temporal key, AAD, nonce, and MPDU data to form the cipher text and MIC. This step is known as CCM originator processing.

f) Form the encrypted MPDU by combining the original MPDU header, the CCMP header, the encrypted data and MIC.

Figure 5:
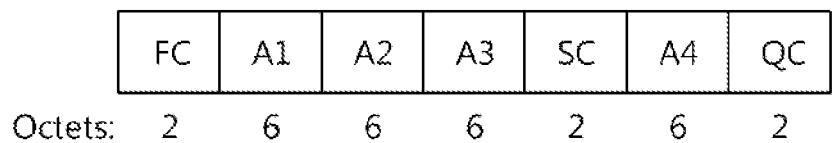
FIG. 5 shows a format of AAD.

FIG. 5 shows a format of AAD. AAD consists of a Frame Control (FC) Field, an Address 1 (A1) field, an Address 2 (A2) field, an Address 3 (A3) field, an Address 4 (A4) field, a Sequence Control (SC) field, and a QoS Control (QC) field. Herein, specific fields can be masked to a value 0.

Figure 6:
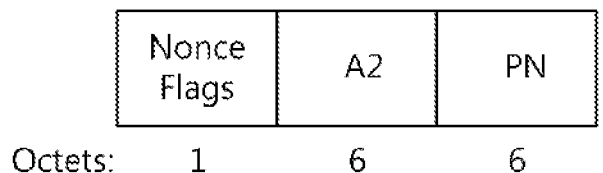
FIG. 6 shows a structure of Nonce.

FIG. 6 shows a structure of Nonce. Nonce consists of Nonce Flags, Address 2 (A2), and PN values.

Figure 7:
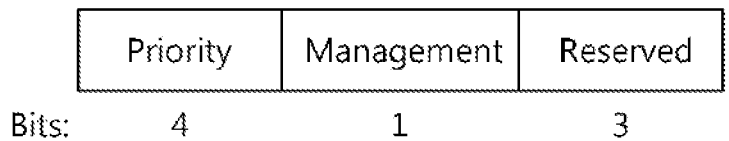
FIG. 7 shows a structure of a Nonce Flags subfield included in Nonce.

FIG. 7 shows a structure of a Nonce Flags subfield included in Nonce. A TID value of a QoS Control field included in a MAC Header is used as a value that is set to a Priority field of FIG. 7. A Management field indicates whether a corresponding plaintext MPDU is a management frame.

A Management Frame QoS (MFQ) can be used as a method for providing QoS for the management frame. To provide a QoS service, EDCA (Enhanced Distributed Channel Access) AC (Access Category) is transmitted together with the management frame, and the EDCA AC is determined according to a configured policy. An MFQ service is a service in which the EDCA access category with which a management frame is sent is determined according to a configured policy. Hereinafter, an MFQ frame is a management frame transmitted by using the MFQ service.

Although the MFQ frame corresponds to the management frame, the MFQ frame has an Access Category and is transmitted in accordance with the Access Category. That is, channel access is achieved by using a Contention Window, arbitration interframe space (AIFS) value corresponding to the Access Category.

In a data frame, an AC (Access category) is included in a QoS Control field of the MAC header. However, in the WLAN system, the Management frame does not have the QoS Control field. Therefore, a problem arises in a method of allowing the MFQ frame to include the AC in an MFQ frame which corresponds to the management frame but has the AC. An access category of the MFQ frame may be included with a length of 2 bits in a sequence number subfield of a sequence control field of the MFQ frame.

Figure 8:
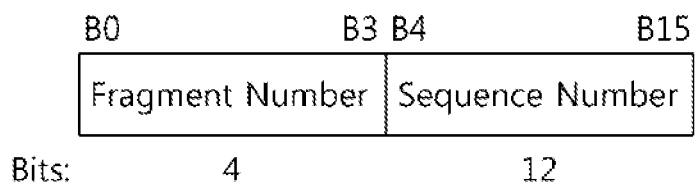
FIG. 8 shows a format of a Sequence Control field.

FIG. 8 shows a format of a Sequence Control field.

The Sequence Control field consists of a Sequence Number subfield and a Fragment Number subfield.

The Fragment Number field is a 4-bit field indicating the number of each fragment of an MSDU (MAC service data unit) or MMPDU (MAC management protocol data unit). The fragment number is set to 0 in the first or only fragment of an MSDU or MMPDU and is incremented by one for each successive fragment of that MSDU or MMPDU. The fragment number is set to 0 in the only fragment of an A-MSDU (aggregate MAC service data unit). The fragment number remains constant in all retransmissions of the fragment.

The Sequence Number field is a 12-bit field indicating the sequence number of an MSDU, A-MSDU, or MMPDU. Each MSDU, A-MSDU, or MMPDU transmitted by a STA is assigned a sequence number. Sequence numbers are not assigned to control frames, as the Sequence Control field is not present. Each fragment of an MSDU or MMPDU contains a copy of the sequence number assigned to that MSDU or MMPDU. The sequence number remains constant in all retransmissions of an MSDU, MMPDU, or fragment thereof.

Figure 9:
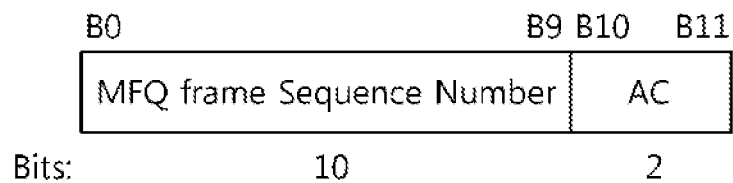
FIG. 9 shows a format of a sequence number subfield that can be applied to an MFQ frame according to an embodiment of the present invention.

FIG. 9 shows a format of a sequence number subfield that can be applied to an MFQ frame according to an embodiment of the present invention.

The sequence control field included in the MFQ frame includes a sequence number subfield having the same format of FIG. 9. An access category of the MFQ frame is included in 2 bits (i.e., B10 and B11) of the sequence number subfield having a length of 12 bits.

The present invention relates to encryption/decryption for the MFQ frame. However, if the MFQ frame is encrypted by using CCMP, the access category needs to be taken into account for encryption/decryption in addition to the conventional encryption of the management frame. According to the embodiment of the present invention, the access category can be taken into account in AAD Construction and Nonce Construction.

Referring back to FIG. 5, the AAD can consist of FC, A1, A2, A3, SC, A4, and QC fields. Each field may include the following contents.

The FC field is an MPDU Frame Control field, and may have a Subtype bits, a Retry bit, a PwrMgt bit, a MoreData bit, a Protected Frame bit, a Protected Frame bit, and an Order bit. The Subtype hits (bits 4 5 6) in a Data MPDU, Retry bit (bit 11), PwrMgt bit (bit 12), MoreData bit (bit 13) may be masked to 0. The Protected Frame bit (bit 14) may set to 1. The Order bit (bit 15) may be masked to 0 in all data MPDUs containing a QoS Control field, and be unmasked otherwise.

The A1 field is a MPDU Address 1 field. The A2 field is a MPDU Address 2 field. The A3 field is a MPDU Address 3 field. The A4 field is a MPDU Address field, if present.

The SC field is a MPDU Sequence Control field. The Sequence Number subfield (bit 4-13 of the Sequence Control field) may be masked to 0 if the Type field of the Frame Control field is 00 (Management frame), when Management Frame Protection is negotiated and both the STA and its peer have their Protected MFQ Capable fields set to 1. The Fragment Number subfield is not modified. Otherwise, Sequence Number subfield (bit 4-15 of the Sequence Control field) masked to 0. The Fragment Number subfield is not modified.

The QC field is a QoS Control field, if present, a 2-octet field that includes the MSDU priority.

Since the sequence number subfield includes an access category value in the MFQ frame, if the STA and the peer STA both support the MFQ service, 10 bits of the sequence number subfield excluding the access category value are masked to 0. Otherwise, all of 12 bits of the sequence number can be masked to 0.

It has been described above that information reporting whether the STA and the peer STA support the MFQ service can be included in the beacon frame or the probe response frame. According to the embodiment of the present invention, a Protected MFQ Capable field for reporting whether the MFQ service is supported can be included in an RSN Capabilities field for example.

FIG. 10 shows an example of an RSN Information element format that can be included in a Beacon frame, an Association Request frame, an Association Response frame, etc.

The RSN element contains authentication and pairwise cipher suite selectors, a single group cipher data suite selector, an RSN Capabilities field, the PMK identifier (PMKID) count, a PMKID list, and a single group management cipher suite selector. The size of the RSN element is limited by the size of an element, which are 255 octets. Therefore, the number of pairwise cipher suites, AKM suites, and PMKIDs is limited.

FIG. 11 shows an example of a format of an RSN Capabilities field among RSN Information elements.

The RSN Capabilities field may indicate requested or advertised capabilities. If the RSN Capabilities field is not present, the default value of 0 is used for all the capability subfields. The length of the RSN Capabilities field may be 2 octets.

According to the embodiment of the present invention, in order to report that the STA supports an MFQ service, a reserved bit of the RSN Capabilities field can be used. For example, a bit 8 of the RSN Capabilities field can be set to a Protected MFQ Capable field, and thus a be used to report whether a UE supports encryption/decryption for the MFQ frame. That is, a STA that supports the MFQ service can transmit the Protected MFQ Capable field by setting it to 1.

Referring back to FIG. 6, Nonce used for encryption/decryption of an MFQ frame includes Nonce Flags, A2, and PN fields in the embodiment of the present invention. Referring to FIG. 7, the Nonce Flags field includes a Priority subfield (4 bits) and a management field (1 bit).

The Nonce Flags can be configured as follows.

When the QC field is present, bits 0 to 3 of the Priority subfield may be set to the value of the QC TID (bits 0 to 3 of the QC field). When Management Frame Protection is negotiated and both the STA and its peer have their Protected MFQ Capable fields set to 1, bits 0 to 1 of the Priority subfield may be set to the value of the Access Category of Sequence Number field (bits 10 to 11 of the Sequence Number field) and bits 2 to 3 of the Priority subfield may be set to the fixed value of 0 if the Type field of the Frame Control field is 00 (Management frame). Otherwise, the Priority subfield of the Nonce Flags field may be set to the fixed value 0.

When MFQ service is negotiated, the Management field of the Nonce Flags field may be set to 1 if the Type field of the Frame Control field is set to 00 (Management frame); otherwise it is set to 0.

Figure 12:
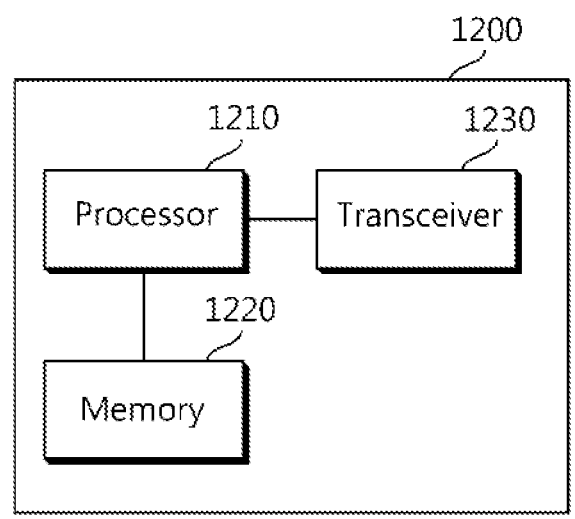
FIG. 12 is a schematic block diagram of a wireless apparatus according to an exemplary embodiment of the present invention.

FIG. 12 is a schematic block diagram of a wireless apparatus according to an exemplary embodiment of the present invention. A wireless apparatus 1200 may be an AP station or a non-AP station.

The wireless apparatus 1200 includes a processor 1210, a memory 1220, and a transceiver 1230. The transceiver 1230, transmitting and receiving a radio signal, implements a physical layer of IEEE 802.11 standard. The processor 1210, operatively connected to the transceiver 1230, implements a MAC layer and a physical layer of IEEE 802.11 standard. The processor 1210 may generate RSN information element proposed by the present invention and transmit frames including the RSN information element to a counterpart STA via the transceiver 1230 to implement the foregoing channel access, the control frame transmission/reception and data transmission method. The processor 1210 and/or the transceiver 1230 may include an ASIC (application-specific integrated circuit), a chip set, a logical circuit and/or a data processing device. The memory 1220 may include a ROM (read-only memory), a RAM (random access memory), a flash memory, a memory card, a storage medium, and/or any other storage device. When the embodiments are implemented by software, the foregoing schemes may be implemented by modules (processes, functions, or the like) performing the foregoing functions. The modules can be stored in the memory 1220 and executed by the processor 1210. The memory 1220 may be provided within or outside the processor 1210, or may be connected to the processor 1210 by means of a well-known unit.

The embodiments described above in detail are only examples explaining the technical spirit of the invention and it should be understood that the technical spirit is not limited to the embodiments. The scope of the invention is defined by the appended claims.

What is claimed is:

1. A method of cipher communication performed by a station in a wireless local area network system, the method comprising:
obtaining a pseudo noise (PN) code sequence for a plaintext Medium Access Control (MAC) protocol data unit (MPDU);
constructing an additional authentication data (AAD) by using at least one field in a header of the plaintext MPDU;
constructing a Nonce from the PN code sequence, an Address 2 field in the header of the plaintext MPDU and a Priority field in the header of the plaintext (MPDU);
generating a counter mode (CTR) with cipher block chaining (CBC)-MAC Protocol (CCMP) header including a new PN code sequence and a key identifier;
generating encrypted data and Message Integrity Code (MIC) by using a temporal key, the AAD, and the Nonce; and
generating an encrypted MPDU to be transmitted to a peer station by combining the header of the plaintext MPDU, the CCMP header, the encrypted data and the MIC, wherein, when the plaintext MPDU is a management frame and Quality of service Management Frame (QMF) is supported, a priority subfield included in the Nonce is set to a value in an access category field of a sequence number field included in the management frame, and
wherein, when the plaintext MPDU is the management frame and management frame protection is negotiated, a management subfield included in the Nonce is set to a predefined value.

2. The method of claim 1, wherein the management subfield included in the Nonce is set to the predefined value if the QMF is supported.

3. The method of claim 1, wherein the access category field indicates a category of data included in the plaintext MPDU.

4. The method of claim 1, wherein the predefined value is '1'.

5. The method of claim 1, wherein the priority subfield and the management subfield included in the Nonce are determined based on a capability of the peer station.

6. The method of claim 5, wherein the capability of the peer station is indicated by a robust security network (RSN) capabilities field format.

7. The method of claim 6, wherein the RSN capabilities field format indicates whether the QMF is supported by the peer station.

8. The method of claim 1, wherein the sequence number field has a length of 12 bits and the access category, field has a length of 2 bits that are last bits of the sequence number field.

9. The method of claim 8, wherein the sequence number field is masked m a value 0.

10. The method of claim 1, wherein the AAD further includes a QoS control field indicating priority of the plaintext MPDU.

11. An apparatus for perforating cipher communication in a wireless local area network system, the apparatus comprising:
a radio frequency unit configured to transmit and/or receive a radio signal; and a processor coupled to the radio frequency unit and configured to:
obtain a pseudo noise (PN) code sequence for a plaintext Medium Access Control (MAC) protocol data unit (MPDU);
construct an additional authentication data (AAD) by using at least one field in a header of the plaintext PDU;
construct a Nonce from the PN code sequence, an Address 2 field in the header of the plaintext MPDU and a Priority field in the header of the plaintext MPDU;
generate a counter mode (CTR) win cipher block chaining (CBC)-MAC Protocol (CCMP) header including a new PN code sequence and a key identifier;
generate encrypted data and Message Integrity Code (MIC) by using a temporal key, the AAD, and the Nonce; and generate an encrypted MPDU to be transmitted to a peer station by combining the header of the plaintext MPDU, the CCMP header, the encrypted data and the MIC, wherein, when the plaintext MPDU is a management frame and Quality of service Management Frame (QMF) is supported, a priority subfield included in the Nonce is set to a value in an access category field of a sequence number field included in the management frame, and wherein, when the plaintext MPDU is the management frame and management frame protection is negotiated, a management subfield included in the Nonce is set to a predefined value.

12. The apparatus of claim 11, wherein the management subfield included in the Nonce is set to the predefined value if the QMF is supported.

13. The apparatus of claim 11, Wherein the access category field indicates a category of data included in the plaintext MPDU.

14. The apparatus of claim 11, wherein the predefined value is '1'.

15. The apparatus of claim 11, wherein the priority subfield and the management subfield included in the Nonce are determined based on a capability of the peer station.

16. The apparatus of claim 15, wherein the capability of the peer station is indicated by a robust security network (RSN) capabilities field format.

17. The apparatus of claim 16, wherein the RSN capabilities field format indicates whether the QMF is supported by the peer station.

18. The apparatus of claim 11, wherein the sequence number field has a length of 12 bits and the access category field has a length of 2 bits that are last bits of the sequence number field.

19. The apparatus of claim 18, wherein the sequence number field is masked to a value 0.

20. The apparatus of claim 11, wherein the ADD further includes a QoS control field indicating priority of the plaintext MPDU.

* * * * *